(12) United States Patent
Iwasawa

(10) Patent No.: US 7,085,674 B2
(45) Date of Patent: Aug. 1, 2006

(54) ALARM MANAGEMENT METHOD AND APPARATUS THEREFOR

(75) Inventor: Koji Iwasawa, Kyoto (JP)

(73) Assignee: Nissin Ion Equipment Co., Ltd., Kyoto (JP)

(*) Notice: Subject to any disclaimer, the term of this patent is extended or adjusted under 35 U.S.C. 154(b) by 19 days.

(21) Appl. No.: 10/721,084

(22) Filed: Nov. 26, 2003

(65) Prior Publication Data

US 2004/0133402 A1 Jul. 8, 2004

(30) Foreign Application Priority Data

Nov. 29, 2002 (JP) .......................... P2002-347559

(51) Int. Cl.
*G06F 15/00* (2006.01)

(52) U.S. Cl. .................................................. 702/179
(58) Field of Classification Search ................ 702/179, 702/188, 1.81; 700/273, 108, 146; 73/53; 342/457, 465, 387; 455/456
See application file for complete search history.

(56) References Cited

U.S. PATENT DOCUMENTS

| | | | |
|---|---|---|---|
| 4,749,985 A | 6/1988 | Corsberg | |
| 5,257,206 A * | 10/1993 | Hanson | 700/273 |
| 5,339,257 A | 8/1994 | Layden et al. | |
| 5,642,296 A | 6/1997 | Saxena | |
| 6,363,294 B1 | 3/2002 | Coronel et al. | |
| 6,571,145 B1 * | 5/2003 | Matsumiya et al. | 700/95 |
| 6,629,009 B1 * | 9/2003 | Tamaki | 700/108 |
| 2002/0069199 A1 | 6/2002 | Kang | |
| 2004/0159714 A1 * | 8/2004 | Gatling et al. | 236/51 |

FOREIGN PATENT DOCUMENTS

| | | |
|---|---|---|
| FR | 2583191 | 12/1986 |
| GB | 2083258 | 3/1982 |
| GB | 2 341 458 | 3/2000 |
| JP | 04 269 626 | 9/1992 |
| JP | 06-332910 | 12/1994 |
| JP | 08-228211 * | 9/1996 |
| JP | 11 134 154 | 5/1999 |
| JP | 11-143744 | 5/1999 |
| JP | 2000-097814 | 4/2000 |
| JP | 2001 01 4025 | 1/2001 |
| WO | WO2003/085504 | 10/2003 |

OTHER PUBLICATIONS

British Search Report, Application No. GB 0327813.2, Mar. 24, 2004 (3 pages).
UK Search Report for Application No. GB 0526091.4 dated Feb. 22, 2006.

* cited by examiner

*Primary Examiner*—John Barlow
*Assistant Examiner*—Tung S. Lau
(74) *Attorney, Agent, or Firm*—Finnegan, Henderson, Farabow, Garrett & Dunner, L.L.P.

(57) ABSTRACT

An alarm management device includes: a data collection device for collecting alarm data generated by an apparatus to be managed; a database device for storing the collected alarm data; and an alarm statistic device for preparing alarm statistics using the stored alarm data. The alarm statistic device includes: a weight coefficient provision unit for providing, for each alarm, one or more weight coefficient types; a total weight coefficient calculation unit, for multiplying these weight coefficients to obtain a total weight coefficient for each alarm; a weighted case count calculation unit, for multiplying, by the total weight coefficient, a "1" that represents a case count for the generation of each alarm and for obtaining a weighted case count; and a statistic preparation unit, for adding the weighted case counts for the individual alarms to prepare statistics for the weighted number of alarm generation cases.

20 Claims, 7 Drawing Sheets

ALARM MANAGEMENT METHOD AND APPARATUS THEREFOR

BACKGROUND OF THE INVENTION

1. Field of the Invention

The present invention relates to a method and an apparatus for preparing the statistics for alarms generated by an apparatus to be managed, and for managing the alarms. An example apparatus to be managed is a semiconductor manufacturing apparatus, for manufacturing or inspecting semiconductors, or a liquid crystal display manufacturing apparatus, for manufacturing or inspecting a liquid crystal display, or an ion beam irradiation apparatus used for these apparatuses.

2. Description of the Related Art

For the management of alarms generated by this apparatus to be managed, in the related-art, cases wherein an alarm was generated are simply added for individual alarms, and either a list, a so-called worst list, is prepared in which individual alarms are presented in order, beginning with the largest number of cases, or an analysis chart is prepared, such as a graph in which percentages are used or a Pareto chart.

Further, as a filtering method for designating, or extracting, data to be used for statistics in cases wherein alarms are generated, normally, filtering according to dates and time ranges has been performed. As another method, a technique for employing a lot ID (lot identification information) to perform filtering had also been proposed (see JP-A-6-332910 (paragraph numbers 0008 and 0012, FIG. 1)).

The related-art alarm management technique has the following problems (1) and (2).

(1) The manner in which the alarm statistics are obtained does not match the purpose.

The purpose for which alarm statistics are obtained is mainly the improvement, by employing the statistics, of the efficiency with which the usage of an apparatus is managed. Various problems, failures and defects that result in a reduction in the usage efficiency are acknowledged as alarms by the user and the supplier of the apparatus. The user or the supplier analyzes the alarm statistics, and prepares countermeasures for the cases, beginning with the one that seems most important, in order to improve the usage efficiency of the apparatus. Therefore, the alarm statistics must be those that reflect, as exactly as possible, the affect each alarm will have on the usage efficiency of the apparatus.

However, since in each alarm case the degree of the affect attained is not shown by the related-art alarm statistics, generally, it is concluded that "the alarm that was generated most frequently is the most important", which is often not correct. An example of this is shown below.

Assume that, during a specific period of time, the number of cases wherein a specific alarm having an example alarm ID of 1001 was generated is 20 and the length of the average period the apparatus was halted when this alarm was generated is one hour, and that the number of cases for which another alarm having an example alarm ID of 3050 was generated is five and the average period the apparatus was halted when this alarm was generated is 10 hours. And that according to the related-art alarm statistics the alarm having the ID 1001 is regarded as being four times more important. However, during the specific period, since the hours the apparatus was halted while the alarm having the ID 1001 and the alarm having the ID 3050 were generated was 20 hours and 50 hours respectively the alarm having the ID 3050 is 2.5 times sore important than is the alarm having the ID 1001, viewed from the affect produced as it relates to the efficiency attained using the apparatus to be managed.

For this example, an explanation has been given for the analysis of the alarm statistics for improving the usage efficiency of the apparatus to be managed. However, various other purposes can be considered, such as a reduction in the maintenance fee for the apparatus to be managed and a reduction in the number of steps performed by the maintenance person. Depending on these purposes, it will be good for an appropriate method to be available for evaluating the affect; however, the related-art alarm management method for preparing the alarm statistics can not perform such an evaluation process.

(2) Alarm statistics can not be employed for pursuing the cause of the generation of an alarm.

Another problem with the related-art alarm management technique is posed by the function for linking (coupling) the alarm statistics with apparatus data representing the status of an apparatus to be managed. When an important alarm, one for which a countermeasure should be applied, has been generated, this does not automatically mean that the role played by the alarm statistics has been completed. While the ideal is for the alarm statistics to be used for designating the reason behind the generation of the alarm, the use of the related-art alarm statistics is not rendered inappropriate because the linking of alarm data with the apparatus data is not satisfactory.

Relative to this viewpoint, the technique disclosed in JP-A-6-332930, concerning the filtering of alarms using lot IDs, is not satisfactory either. Although the lot IDs are correlated with multiple sets of apparatus data, the lot IDs are not always uniquely coupled with these multiple apparatus data sets. That is, even when there is a corresponding lot ID, the operating parameter for the apparatus is not always the same as when the pertinent lot was processed. More specifically, even when the processing recipe, which is a processing condition for the processing of a specific lot, can be designated in accordance with the ID for this lot, the processing recipe is provided by multiple apparatus operating parameters (can be regarded as apparatus data). Thus, even when several of these operating parameters seem to have contributed to the generation of an alarm, in differing processing recipes, these parameters could have the same value. Therefore, the filtering method for each processing recipe using lot IDs is too inaccurate, and it would be difficult to designate an operating parameter that would cause the alarm to be gen rated.

SUMMARY OF THE INVENTION

It is, therefore, one objective of the present invention to evaluate the degree to which, in accordance with a purpose, each alarm is affected. It is another objective of the invention to make it easy to discover why an alarm is generated.

One alarm management method according to a first aspect of the invention comprises:

providing one or more types of weight coefficients for each alarm generated by an apparatus to be managed;

multiplying the weight coefficient types to obtain the total weight coefficient for each alarm;

multiplying, by the total weight coefficient, a "1", which represents a case count for one generation of each alarm, and obtaining a weighted case count for each alarm; and adding the weighted case counts for individual alarms to prepare statistics for the weighted number of alarm generation cases.

According to this alarm management method, since the weight coefficient consonant with a purpose can be provided for each alarm generated by the apparatus to be managed, using the statistics for the weighted number of cases for the alarm generation, the degree to which each alarm is affected can be evaluated in accordance with the purpose.

In the first aspect of alarm management method, according to a second aspect of an alarm management method, the one or more weight coefficient types may include a weight coefficient designated by a user as an inherent value f r each alarm type.

In the first aspect of the alarm management method, according to a third aspect of an alarm management method, the one or more weight coefficient types may include a weight coefficient designated by a user for each time an alarm is generated.

In the first aspect of the alarm management method, according to a fourth aspect of an alarm management method, the one or more weight coefficient types may include a weight coefficient that is automatically determined based on a predetermined role.

In the fourth aspect of the alarm management method, according to a fifth aspect of an alarm management method, the automatically determined weight coefficient is determined in accordance with a period extending from the generation, in the apparatus, of a specific alarm to be managed until the specific alarm is canceled.

Another alarm management method according to a sixth aspect of this invention comprises:

correlating each alarm generated by an apparatus to be managed and apparatus data representing the status of the apparatus by employing a date and time wherein the alarm was generated as a key;

preparing a trend graph for predetermined apparatus data included in the apparatus data obtained from the apparatus to be managed; and displaying on the trend graph a date and time whereat a predesignated alarm was generated based on the correlation.

According to the alarm management method, since the alarm generated by the apparatus to be managed is correlated with apparatus data by using as a key the date and time whereat the alarm was generated, the relationship between the generation of the alarm and predetermined apparatus data can be obtained. That is, since by using the trend graph, together with a value for the predetermined apparatus data, the location whereat the alarm was generated can be easily determined, and the reason the alarm was generated can be easily ascertained.

An additional alarm management method according to a seventh aspect of the invention comprises:

preparing statistics only for alarms that were generated by an apparatus to be managed when predetermined apparatus data included in the apparatus data that are obtained from the apparatus and that represent the status of the apparatus, have a predesignated value or are within a predesignated range.

According to this alarm management method, since the thus prepared statistics can be employed to identify the condition wherein the alarm was generated in a specific operating state of the apparatus to be managed, the reason the alarm was generated can be easily determined. The statistics that are thus acquired can also be effectively employed for a countermeasure that, first of all, is generated for an alarm for a specific condition.

In the first, sixth or seventh aspect of the alarm management method, according to an eighth aspect of an alarm management method, the alarms may be managed using alarm IDs for identifying the alarms.

One alarm management apparatus according to a ninth aspect of the intention comprises:

a data collection device for collecting alarm data for alarms generated by an apparatus to be managed;

a database device for storing the alarm data collected by the data collection device; and an alarm statistic device for preparing alarm statistics using the alarm data stored by the database device, the alarm statistic device including, a weight coefficient provision unit for providing one or more types of weight coefficients for each alarm, a total weight coefficient calculation unit for multiplying the weight coefficients for each alarm to obtain a total weight coefficient, a weighted case count calculation unit for multiplying, by the total weight coefficient, a "1" that represents a case count for one generation of each alarm, and for obtaining a weighted case count for each alarm, and a statistics preparation unit for adding weighted case counts for individual alarms to obtain statistics for the weighted number of alarm generation cases.

According to this alarm management apparatus, since the weight coefficient consonant with an intended purpose can be provided for each alarm generated by the apparatus to be managed, using the statistics for the weighted number of cases for the alarm generation, the degree to which each alarm is affected can be evaluated in accordance with the purpose.

In the ninth aspect of the alarm management apparatus, according to a tenth aspect of an alarm management apparatus, the alarm statistic device may include a weight coefficient setup unit for setting up, as one of the weight coefficients, a unique weight coefficient for each alarm type.

In the ninth aspect of the alarm management apparatus, according to an eleventh aspect of an alarm management apparatus, the alarm statistic device may include a weight coefficient setup unit for setting up, as one of the weight coefficients, a weight coefficient for each time an alarm is generated.

In the ninth aspect of the alarm management apparatus, according to a twelfth aspect of an alarm management apparatus, the alarm statistic device may include a weight coefficient determination unit for automatically determining, based on a predetermined rule, a weight coefficient as one of the weight coefficients.

In the twelfth aspect of the alarm management apparatus, according to a thirteen aspect of an alarm management apparatus, the weight coefficient determination unit may determine a weight coefficient in accordance with a period extending from the generation, in the apparatus, of a specific alarm to be managed to the cancellation of the specific alarm.

Another alarm management apparatus according to a fourteenth aspect of the invention comprises:

a data collection device for collecting alarm data for alarms generated by an apparatus to be managed;

a database device for storing the alarm data collected by the data collection device; and an alarm statistic device for preparing alarm statistics using the alarm data stored by the database device, the alarm statistic device including, a linking unit for employing, as a key, a date and a time whereat an alarm was generated and for correlating each alarm generated by the apparatus with apparatus data representing the status of the apparatus, a trend graph preparation unit for preparing a trend graph for predetermined apparatus data included in the apparatus data, and a display unit for displaying the trend graph prepared by the trend graph preparation unit, and for, based on the correlation, displaying on the trend graph a date and time whereat a predesignated alarm was generated.

According to the alarm management apparatus, since an alarm generated by the apparatus to be managed is correlated with apparatus data by using as a key the date and time whereat the alarm was generated, the relationship between the generation of the alarm and predetermined apparatus data can be obtained. That is, using the trend graph, together with a value for the predetermined apparatus data, the alarm that was generated can be easily identified and the reason the alarm was generated can be readily determined.

An additional alarm management apparatus according to a fifteenth aspect of an alarm management apparatus of the invention comprises:

a data collection device for collecting alarm data for alarms generated by an apparatus to be managed;

a database device for storing the alarm data collected by the data collection device; and an alarm statistic device for preparing alarm statistics using the alarm data stored by the database device, the alarm statistic device including, a filtering unit for extracting, as statistical targets, only alarms that were generated by the apparatus when predetermined apparatus data, included in apparatus data, had a predesignated value or was within a predesignated range, and a statistics preparation unit for preparing statistics for the alarms extracted by the filtering unit.

According to this alarm management apparatus, since the thus prepared statistics can be employed to identify the condition wherein the alarm was generated in a specific operating state of the apparatus to be managed, the reason the alarm was generated can be easily determined. The thus prepared statistics can also be effectively employed for a countermeasure that, first of all, is for an alarm generated for a specific condition.

In the ninth, fourteenth, or fifteenth aspect of the alarm management apparatus, according to a sixteenth aspect of an alarm management apparatus, the alarms may be managed by alarm IDs for identifying the alarms

DETAILED DESCRIPTION OF THE INVENTION

Figure 1:
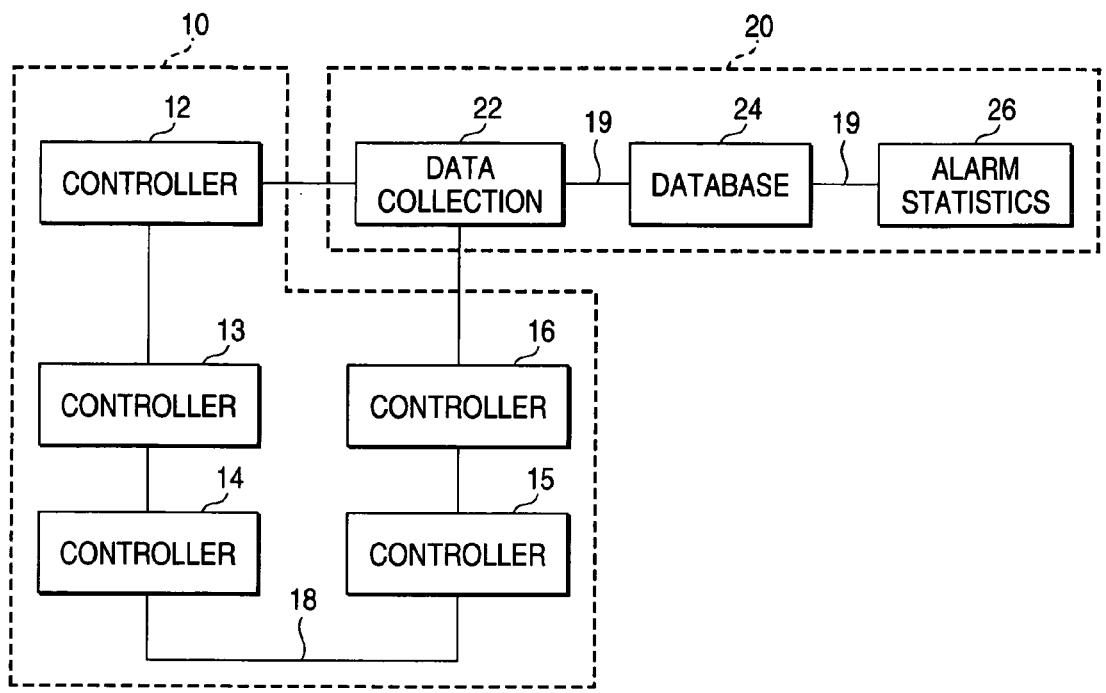
FIG. 1 is a block diagram showing an example alarm management apparatus that performs an alarm management method according to the present invention, and an example apparatus to be managed.

FIG. 1 is a block diagram showing an example alarm management apparatus that employs an alarm management method according to this invention, and an example apparatus to be managed by the alarm management apparatus. An alarm management apparatus 20 is connected by a signal transmission path 18 to an apparatus 10 to be managed.

In this embodiment, the apparatus 10 to be managed comprises: sub-controllers 13 to 16, for controlling various devices (not shown) constituting the apparatus 10; a main controller 12, for controlling all the sub-controllers 13 to 16; and the signal transmission path 18, having a loop shape, that connects the controllers 12 to 16, which together constitute a network.

When the apparatus 10 is an ion implanter, which is one type of ion beam irradiation apparatus, the sub-controllers 13 to 16 are those described below.

The sub-controller 13 is an implantation controller for controlling the ion implantation operations performed for a wafer, such as the mechanical scanning of a target wafer, the scanning of an ion beam and the control of the dose amount.

The sub-controller 14 is a beam controller for controlling various power sources for various types of devices that generate an ion beam and transfer the ion beam to a wafer.

The sub-controller 15 is an end station controller for controlling the handling of a wafer.

The sub-controller 16 is a system controller for controlling the devices, other than the power sources, and for controlling vacuum system.

Each alarm generated by the apparatus 10 to be managed may be managed as a text form that directly represents the contents of the alarms. In this embodiment, however, each alarm is managed by using an alarm ID that provides identification information for identifying the alarm, and this method is preferable because the amount of data to be handled can be reduced and the display of an alarm can be simplified. Therefore, in this embodiment, the alarm ID is transmitted within the apparatus 10 to be managed, and from the apparatus 10 to the alarm management apparatus 20. Although the alarm ID is uniquely linked with the alarm contents, in order to easily understand the relationship existing between the two, a list having a text form, showing the correlation of the alarm ID with the alarm contents, may be stored in the main controller 12 and may be read as needed when it is to be used.

In this embodiment, in addition to the function for controlling the sub-controllers 13 to 16, the main controller 12 also has a function for transmitting, to a data collection device 22 of the alarm management apparatus 20, when an alarm is generated by the main controller 12 or one of the sub-controllers 13 to 16, alarm data consisting of the alarm ID for the alarm and the date and the time whereat the alarm was generated. Further, when an operator has removed the cause of an alarm, and has depressed the alarm cancel button (not shown) for the main controller 12, the main controller 12 cancels the alarm, and transmits, to the data collection device 22, the alarm data consisting of the alarm ID for the alarm and the date and the time whereat the alarm was canceled. That is, the alarm data generated by the apparatus 10 to be managed (more specifically, the main controller 12 in this embodiment) include the alarm ID and the date and the time at which the alarm was generated, or include the alarm ID and the date and the time at which the alarm was canceled.

In this embodiment, the alarm management apparatus 20 comprises: the data collection device 22, a database device 24 and an alarm statistic device 26, all of which are interconnected by a signal transmission path 12.

The data collection device 22 collects the alarm data generated by the apparatus 10 to be managed, and also collects apparatus data generated by the apparatus 10 when the data representing the status of the apparatus 10 are to be linked with the alarm (this will be explained later). Example apparatus data include the process recipe and the set values and monitor values for the apparatus operating parameters. The data collection device 22 collects these data sets, and stores the data in the database device 24. The data collection device 22 also has a function for notifying the alarm statistic device 26 that the alarm data have been received.

Figure 2:
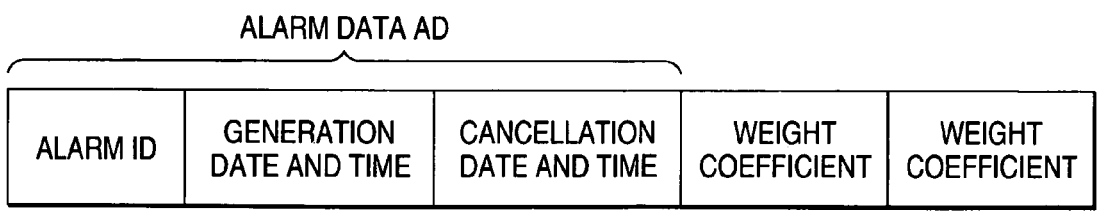
FIG. 2 is a conceptual diagram showing example data wherein weight coefficients are provided for alarm data.

The database device 24 stores the alarm data collected by the data collection device 22. Example alarm data AD stored in the database device 24 are shown in FIG. 2. The alarm data AD includes an alarm ID, an alarm generation date and time, and alarm cancellation data and a time. A weight coefficient will be described later. To provide the linking of the alarm ID with the apparatus data, the apparatus data collected by the data collection device 22 are also stored in the database of the database device 24.

The alarm statistic device 26 prepares alarm statistics by using the alarm data stored in the database device 24 or by using the alarm data and the apparatus data. For the alarm statistic device 26, the processing (A) performed to provide weighting for each alarm and the processing (B) performed to link an alarm with apparatus data will be separately described in detail.

First, the processing (A) performed to provide the weighting for each alarm will be explained.

Figure 3:
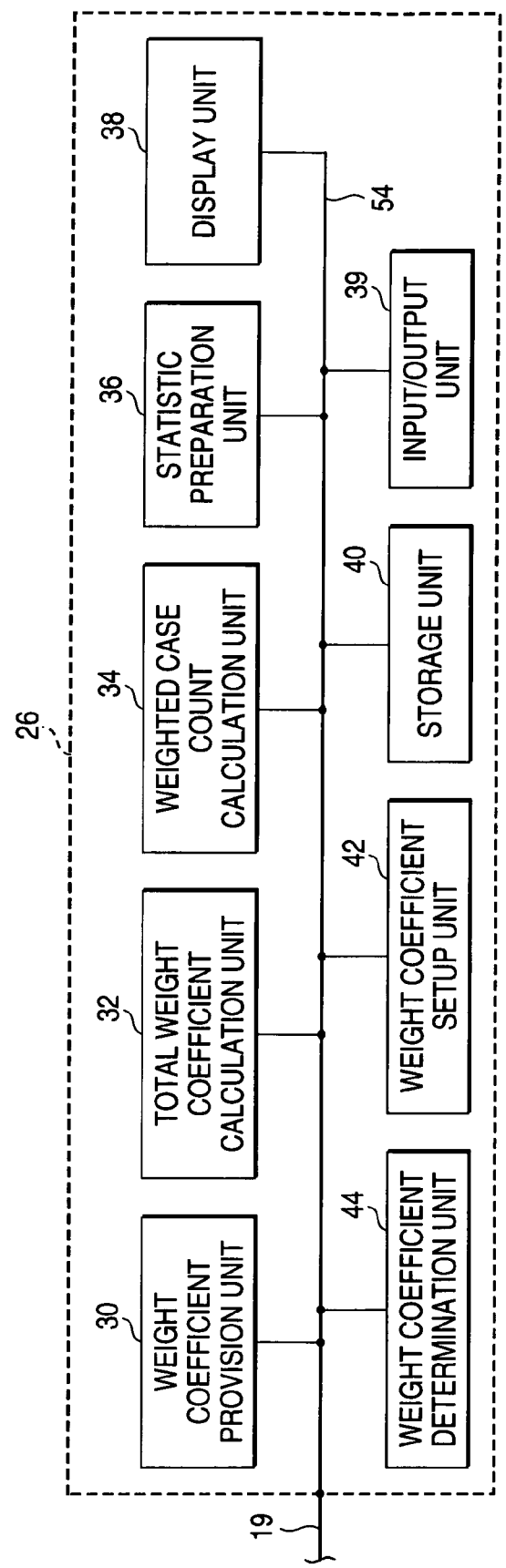
FIG. 3 is a block diagram showing an example configuration for an alarm statistic device.

As is shown in an example in FIG. 3, the alarm statistic device 26 includes: a weight coefficient provision unit 30, a total weight coefficient calculation unit 32, a weighted case count calculation unit 34 and a statistics preparation unit 36. The weight coefficient provision unit 30 provides one or more types of weight coefficients for each alarm. The total weight coefficient calculation unit 32 multiplies, for each alarm, these weight coefficients to obtain the total weight coefficient for the alarm. The weighted case count calculation unit 34 multiplies, by the total weight coefficient, a "1" that represents a case count for one alarm generation, and obtaining a weighted case count. The statistics preparation unit 36 adds the weighted case counts, for the individual alarms, to prepare the statistics for the weighted number of alarm generation cases.

In this embodiment, the alarm statistic device 26 further includes a display unit 38, an input/output unit 39, a storage unit 40, and a weight coefficient setup unit 42 and a weight coefficient determination unit 44, both of which will be described later. The display unit 38 displays the statistics provided by the statistics preparation unit 36. The input/output unit 39 inputs or outputs necessary data. The storage unit 40 stores various data. These unit are preferably provided, and in this embodiment, are interconnected by a signal transmission path 54. The display unit 38 may be a display device.

The one or more types of weight coefficients, which are regarded as the attributes of each alarm, are provided for alarm data AD for each alarm ID, and are stored together with the alarm data AD in the database device 24 in this embodiment. In FIG. 2, in which is shown the alarm data AD to which a weight coefficient has been added, two weight coefficients are employed; however, the number of weight coefficients is not limited to two, and this can also be applied for FIG. 8.

The weight coefficients are roughly sorted into the following two types.

(1) Weight coefficient uniquely determined for each alarm type

As is described above, since in this embodiment the alarms are managed using alarm IDs, the weight coefficient can also be regarded as a weight coefficient uniquely determined for each alarm ID, A detailed explanation for this will be given later.

(2) Weight coefficient uniquely determined each time an alarm is generated

"Each time an alarm is generated" is not limited to the time an alarm is generated or canceled, and this weight coefficient can also be regarded as one for which the determination is made using other then an alarm ID. That is, even when alarms are generated each for which an alarm ID is provided, in each instance, the weight coefficients may differ. A detailed explanation for this will be given below.

The weight coefficient (1) can be designated by a user as a fixed value for each alarm type (i.e., each alarm ID), and the weight coefficient setup unit 42 may set this up as a weight coefficient. The weight coefficient setup unit 42 may be a touch panel provided on the front display face of the display unit 38, or a keyboard. Thereafter, the weight coefficient set by the weight coefficient setup unit 42 is stored in the storage unit 40 in a table, together with a corresponding alarm ID. When a specific alarm is canceled, the alarm statistic device 26 searches the table using the alarm ID as a key, determines the weight coefficient for the alarm, and provides the weight coefficient for the alarm data AD in the database device 24. The thus obtained data is shown in FIG. 2, which is described above.

An example usage of the weight coefficient (1) can be the elimination from the alarm statistics of the data for a specific alarm. Aside from cases involving maintenance or repair work occasioned by an operating failure, there are other cases for which alarms are frequently generated, such as when the door of the storage case of the apparatus 10 is open. These alarms, although naturally important during actual operations, are not required for the alarm statistics employed for improving the usage efficiency of the apparatus 10 to be managed. Therefore, when a weight coefficient of 0 is set for these alarm IDs, and an arbitrary value other than 0, such as 1 or greater, is set for alarm IDs that are required for the preparation of the alarm statistics, data for unnecessary alarms can be easily removed from the alarm statistics.

The weight coefficient (2) can be designated by a user each time an alarm is generated. This setup is also performed by the weight coefficient setup unit 42. That is, in this embodiment, the weight coefficient setup unit 42 serves both as the unit for setting up the weight coefficient (1) and the unit for setting up the weight coefficient (2). The weight coefficient (2) is set when an alarm that is generated is to be canceled. More specifically, when an alarm is to be canceled, the weight coefficient (2) can be designated (entered) in accordance with a dialogue displayed on the control screen of the display unit 38. The alarm statistic device 26 provides the thus designated weight coefficient for the alarm data AD stored in the database device 24 while using the alarm ID as a key. The data obtained in this manner is shown in FIG. 2, as described above.

Since, at the time an alarm is to be canceled, there may not be a person at the alarm statistic device 26 who can enter a weight coefficient, a function may be provided for the alarm statistic device 26 that permits the later, collective entry of weight coefficients. Example methods for this are (a) a method whereby an alarm ID and the alarm canceled date and time are designated in accordance with data presented on the control screen of the display unit 38, and a necessary weight coefficient is entered by the weight coefficient setup unit 42, and (b) a method whereby an alarm canceled list is output as a file by the input/output unit 39 of the alarm statistic device 26, and a required weight coefficient is added to the file and the resultant file is read by the input/output unit 39 in order to enter the weight coefficient in the alarm statistic device 26. For the method (b), the input/output unit 39 for reading the file to which the weight coefficient has been added can be a weight coefficient setup unit.

As an example for which the method (a) or (b) is used, the number of procedures or the operating cost that is accompanied by the generation of an alarm is employed to determine and enter the weight coefficient for the alarm. For example, an operator may obtain a weight coefficient in advance by adding the values for the number of procedures and the operating costs, and may enter this coefficient when an alarm is canceled. Either this, or an operator may report these values to a manager, and the manager may enter weight coefficients for a specified period, such as weekly or monthly.

Among the weight coefficients (2), there is one that the alarm statistic device 26 can automatically determine based on a given predesignated rule. The weight coefficient determination unit 44 performs this determination process. When an alarm is canceled, weight coefficient determination unit 44 automatically determines a weight coefficient based on a predetermined rule, and the weight coefficient provision unit 30 adds this weight coefficient, as one of the two, to the alarm data AD stored in the database device 24. Since to determine the weight coefficient no manpower is needed, less labor is required.

As an example use of this function, a period corresponding to the time the apparatus 10, which is to be managed, is halted for the generation of an alarm is employed as a weight coefficient. Then, when an alarm is canceled, the weight coefficient determination unit 44 searches the database device 24 using an alarm ID as a key, obtains the time the alarm was generated, and subtracts the alarm generation time from the current, alarm cancellation time. As a result, the period extending from the generation of a target alarm to its cancellation can be acquired. Thereafter, the weight coefficient provision unit 30 determines a weight coefficient consonant with the obtained period, and adds this weight coefficient, as one of the two, to the alarm data AD stored in the database device 24. Through this processing, the degree to which the efficiency of the usage of the apparatus 10, which is to be managed, is affected can be added to the alarm statistics.

It is preferable that the alarm statistic device 26 have function for, when the statistics preparation unit 36 prepares alarm statistics, changing the validity/invalidity of the one or more types of weight coefficients. In this embodiment, this function is provided for the weight coefficient provision unit 30. The total weight coefficient calculation unit 32 multiplies the weight coefficients that are regarded as valid by the weight coefficient provision unit 30, and obtains one total weight coefficient for each alarm. The weighted case count calculation unit 34 multiples, by the total weight coefficient, a "1" that represents the case count for one generation of an alarm, and obtains a weighted case count. When the total weight coefficient is 2.5, the weighted case count is 1×2.5=2.5 (cases). The statistics preparation unit 36 adds the weighted case counts for the individual alarms, and prepares the statistics for the weighted number of alarm generation cases.

The form of the statistics for the weighted number of alarm generation cases may be a so-called worst list wherein individual alarms are arranged in order, beginning with the alarm having the largest number of generations, or may be visualized by using an analysis charts such as a percentage graph or a Pareto chart. In this case, it is preferable that alarm IDS be used to represent the individual alarms; however, text containing the corresponding contents may be employed.

The alarm management apparatus 20 can employ the alarm statistic device 26 to perform the alarm management method, whereby one or more types of weight coefficients are provided for each alarm generated by the apparatus 10 to be managed, and are multiplied by each other to obtain a total weight coefficient for each alarm, which is then multiplied by a "1", representing the number of cases for which each alarm was generated, to obtain for the individual alarms weighted case count that are added together to prepare the statistics for the weighted number of alarm generation cases.

According to the alarm management method and the alarm management apparatus 20 therefor, the alarm statistics that enable the value judgment can be prepared by using the weight coefficients, instead of the related-art simple addition of the number of alarms that are generated. That is, since a weight coefficient consonant with a purpose can be provided for each alarm generated by the apparatus 10 to be managed, based on the statistics for the weighted number of the generated alarms, the affect produced by each alarm can be evaluated in accordance with its purpose.

An explanation will now be given for the processing (B) performed to link an alarm with apparatus data.

Figure 4:
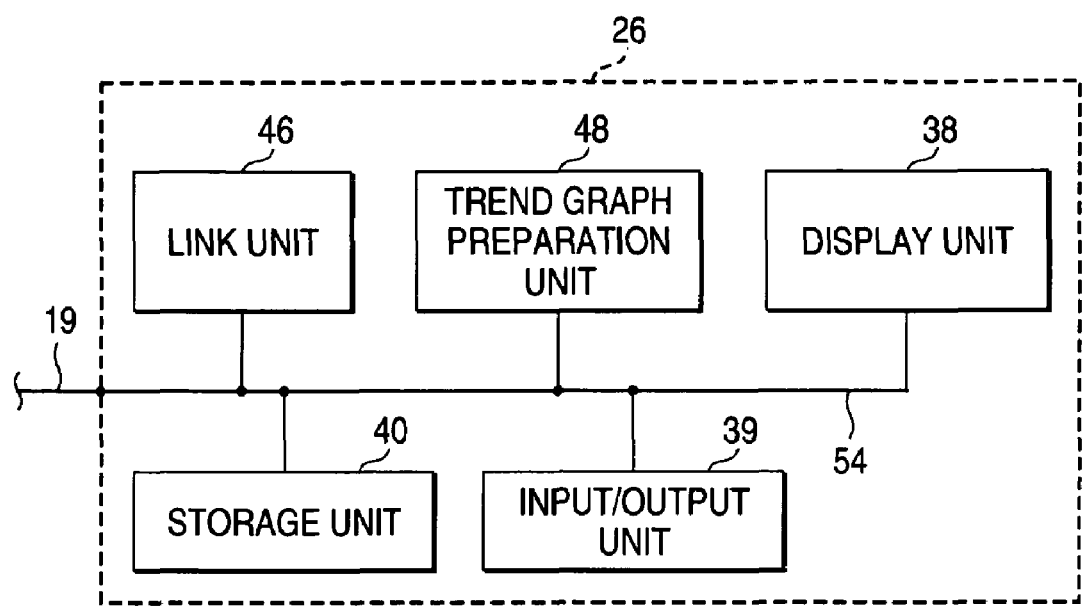
FIG. 4 is a block diagram showing another example configuration for the alarm statistic device.

As is shown in an example in FIG. 4, the alarm statistic device 26 includes a linking unit 46, a trend graph preparation unit 48, and the display unit 38. The linking unit 45 employs as a key a date and time whereat an alarm was generated and for correlating an alarm generated by the apparatus 10 to be managed with apparatus data representing the status of the apparatus 10. The trend graph preparation unit 48 prepares a trend graph for predetermined apparatus data included in the apparatus data. The display unit 38 displays the trend graph generated by the trend graph preparation unit 48 and for, based on the link, also displays, on the trend graph, a date and time whereat a predesignated alarm was generated. The horizontal axis of the trend graph represents the time and the vertical axis represents a specific value, while the trend graph represents a trend or a change in the specific value along the time axis. The example for the display unit 38 has been already described.

In this embodiment, the alarm statistic device 26 also includes, as preferred components, the input/output unit and the storage unit 40. The connection of these components by the signal transmission path 54 has been described above.

The alarm management apparatus 20 having this alarm statistic device 26 can perform the alarm management method whereby the alarm generation date and time is employed as a key for correlating the alarm generated by the apparatus 10 to be managed and the apparatus data that represents the status of the apparatus 10, whereby the trend graph is prepared for predetermined apparatus data included in the apparatus data obtained from the apparatus 10 to be managed, and whereby, based on the correlation, a date and time whereat a predesignated alarm was generated is displayed on the trend graph.

According to this alarm management method and the alarm management apparatus 20 therefor, since the alarm generated by the apparatus 10 to be managed is correlated with the apparatus data by using the alarm generation date and time as a key, the relationship between the generation of the alarm and the predetermined apparatus data can be obtained, That is, the value of the pr d termined apparatus data whereby the alarm was generated can be easily understood by using the trend graph. As a result, the reason the alarm was generated can be easily determined.

Assume that the alarm, "abnormal implanted ion mass" (e.g., alarm ID=3025), is generated. The linking unit 46 designates the apparatus data, "implanted ion mass setup value", as the data to be linked with this alarm ID. Generally, the linking unit 46 also designates the time to perform the linking. Upon the reception of a trend graph preparation instruction, the trend graph preparation unit 48 accesses the database device 24 and searches for the apparatus data (implanted ion mass setup value) that falls within the designated time, and prepares the trend graph for the apparatus data. This example is shown in FIG. 5.

Figure 5:
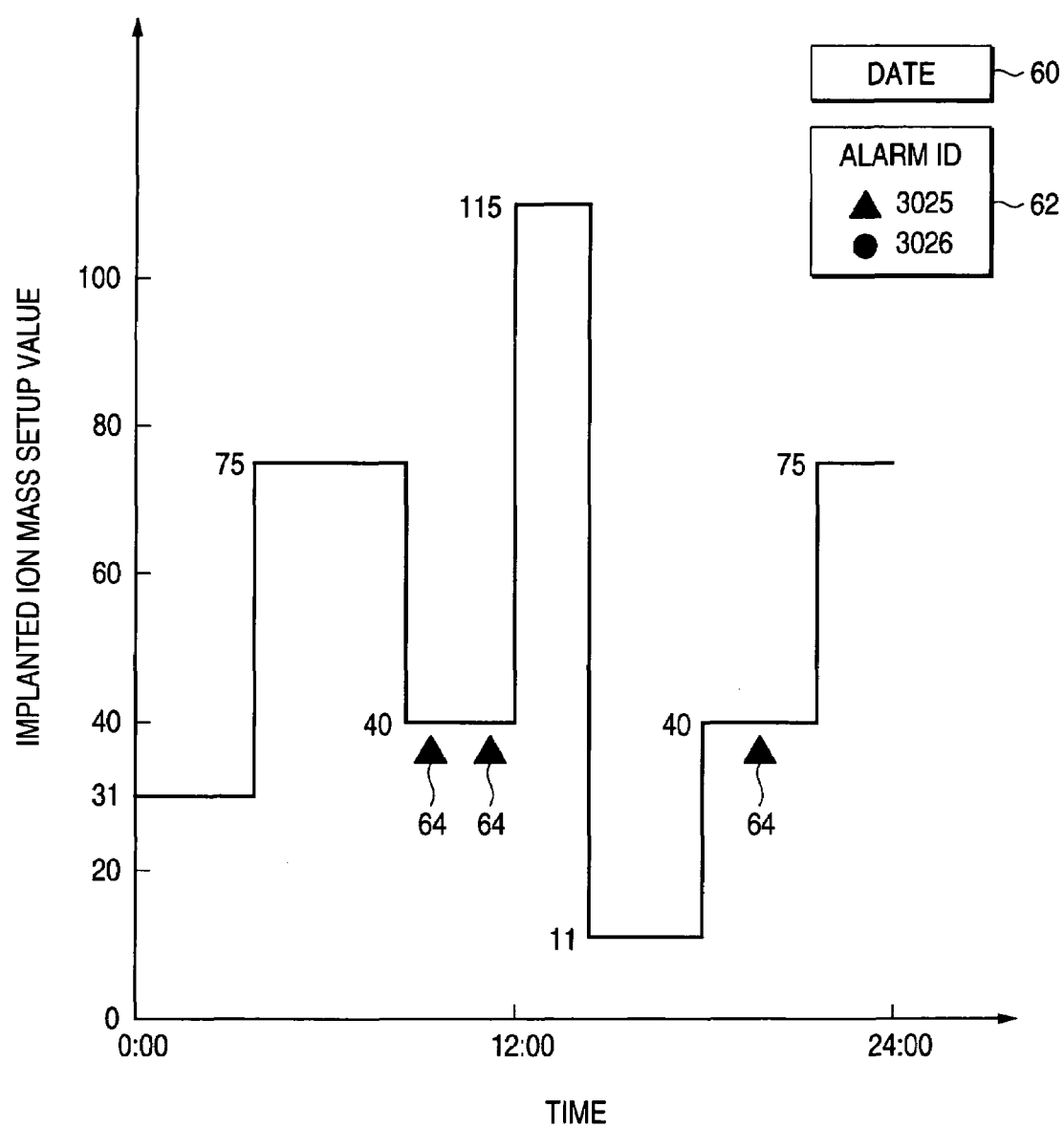
FIG. 5 is an example trend graph.

Thereafter, the display unit 38 displays the trend graph shown in FIG. 5, which is prepared by the trend graph preparation unit 48. Further, based on the data linking, the dates and times whereat predesignated alarms (e.g., alarm IDs=3025 and 3026) were generated are displayed on the trend graph by using ions 64. In other words, the ions 64, representing the generation of alarms, are displayed at the locations for the dates and times whereat these alarms were generated. In FIG. 5, the icons 64 for the alarm ID=3025 are displayed. Since the horizontal axis of the example in FIG. 5 represents the time, the data is displayed in a data display portion 60. With the horizontal axis and the date display portion 60, the date and time whereat the alarm was generated can be presented. The horizontal axis may represent the date and time, and the alarm ID may be displayed together with the icon 64. However, as in this example, it is more preferable that a guide display portion 62 be provided for presenting the correlation of the icon 64 with the alarm ID, because the display around the icon 64 is simplified and easily identified.

In the example in FIG. 5, since the trend wherein the alarm having the alarm ID=3025 was frequently generated at the implanted ion mass setup value 40 is easily obtained, this can be used as an aid for finding the reason the alarm was generated.

Figure 6:
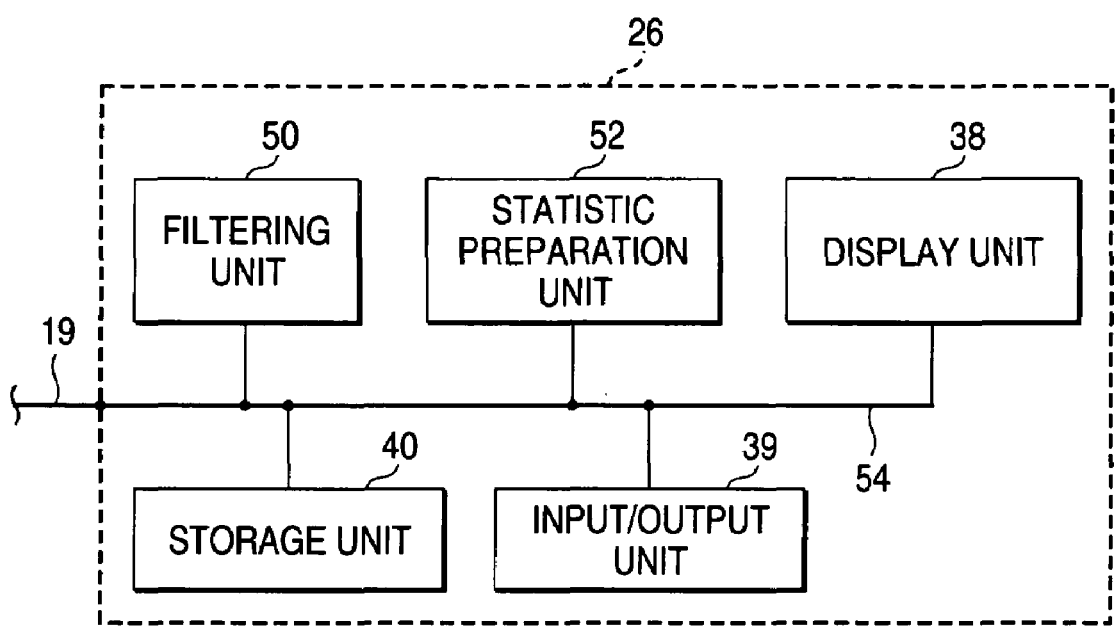
FIG. 6 is a block diagram showing another configuration for the alarm statistic device.

The alarm data filtering function may be employed as another linking function. In this case, as is shown in an example in FIG. 6, the alarm statistic device 26 includes: a filtering unit 50, for extracting, as statistic targets, only those alarms that were generated when predetermined apparatus data, included in the apparatus data, had a predesignated value or a value falling within a predesignated value range; and a statistics preparation unit 52, for preparing the statistics for the alarms extracted by the filtering unit 50. It should be noted that the predetermined apparatus data and the predesignated value or value range can be entered in the filtering unit 50.

In this case, the alarm statistic device 26 also includes, as preferred components, the display unit 38, the input/output unit 39 and the storage unit 40. The connection of these components by the signal transmission path 54 has been explained above.

The alarm management apparatus 20, including the alarm statistic device 26, can perform the alarm management method for the employment of only those alarms that were generated by the apparatus 10 when the predetermined data, included in the apparatus data that were obtained by the apparatus 10 and that represent the status of the apparatus 10, had a predesignated value or a value that fell within a predesignated value range, and for preparing the statistics for these alarms.

According to this alarm management method and the alarm management apparatus 20 therefor, since the alarm generation situation in a specific operating state of the apparatus 10 to be managed can be identified by referring to the thus prepared statistics, the reason the alarm was generated can be easily determined. Further, the statistics prepared in this manner are also effective for the application of a countermeasure that is, first of all, for an alarm generated as the result of a specific condition.

For example, for the filtering unit 50, a specific value (e.g., 11) for the apparatus data, "implanted ion mass setup value", is designated as a filter. Then, alarm statistics can be prepared using only those alarms that were generated at the implanted ion mass 11. Therefore, the alarm generation situation, for a specific condition wherein the implanted ion mass value is 11, can be obtained, and this is affective for the application of a countermeasure that is, first of all, for an alarm generated as a result of this specific condition.

In the example shown in FIG. 1, the alarms generated by one apparatus 10 to be managed are managed by a single alarm management apparatus 20. However, alarms generated by a plurality of apparatuses 10 can also be managed by a single alarm management apparatus 20. This example is shown in FIG. 7.

Figure 7:
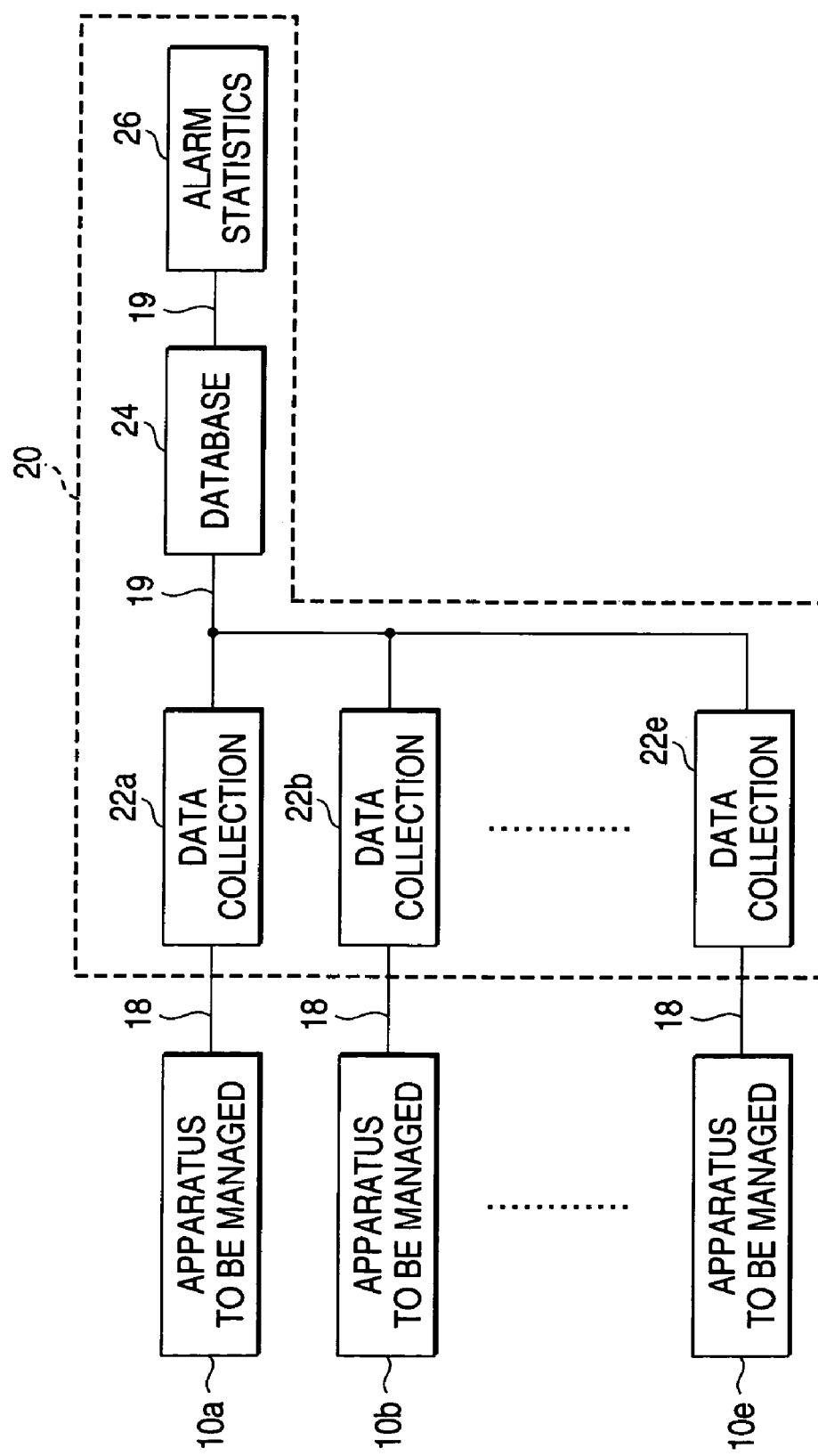
FIG. 7 is a block diagram showing another example alarm management apparatus that performs another alarm management method according to the invention, and another example apparatus to be managed.

In the example in FIG. 7, there are five apparatuses 10a to 10e that are to be managed. The configuration of each of these apparatuses 10a to 10e is the same as that for the apparatus 10 in FIG. 1. The alarm management apparatus 20 in this example includes five data collection devices 22a to 22e for collecting data respectively transmitted by the apparatuses 10a to 10e. The function of each of the data collection devices 22a to 22e is the same as that of the data collection device 22 in FIG. 1. Only one database 24 and one alarm statistic device 26 are required and are shared by the data collection devices 22a to 22e.

In this example, so long as it is possible to identify which of the apparatuses 10a to 10e has generated an alarm, the alarm can then be managed in the same manner as when only one apparatus 10 is employed. To provide this management, as is shown in the example in FIG. 8, only an apparatus ID, which is identification information for identifying an apparatus to be managed, must be added to the alarm data AD, and the same alarm ID can be used by the five apparatuses 10a to 10e. Since an alarm can be specified by using the apparatus ID and the alarm ID, the alarm statistic device 26 shown in FIG. 3, 4 or 6 can be employed substantially unchanged, and each of the individual alarm management methods described above can be employed.

Figure 8:
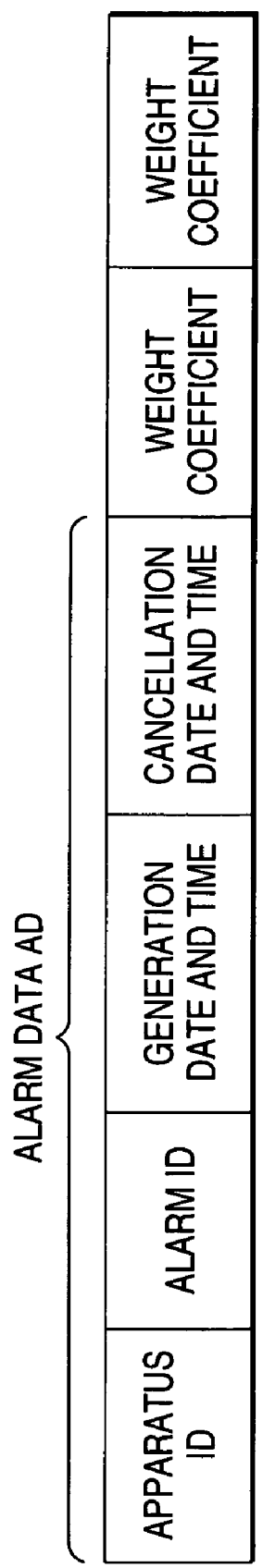
FIG. 8 is a conceptual diagram showing another example of data wherein weight coefficients are provided for alarm data.

Furthermore, when only one apparatus is currently managed as is shown in FIG. 1, and when more apparatuses are to be managed in the future, only the data shown in FIG. 8 need be prepared, and only a single value (e.g., 1) need be entered as the apparatus ID. With this arrangement, it is easy to cope with a future operation when the number of apparatuses to be managed is increased.

The alarm management apparatus 20 in the embodiment may be provided by using a computer.

The present invention having this configuration provides the following effects.

According to the first and ninth aspects of the present invention, since the weight coefficients consonant with the purpose can be provided for the individual alarms generated by the apparatus to be managed, the degree of the affect produced by the alarms can be evaluated in consonance with the purpose, by referring to the statistics for the weighted number of the alarms that are generated.

According to the second and tenth aspects of the present invention, since the weight coefficients are designated as unique values for the individual alarm types, unnecessary alarms can be easily removed from the alarm statistics.

According to the third and eleventh aspects of the present invention, the weight coefficients consonant with the purpose can be freely provided for the individual alarms.

According to the fourth and twelfth aspects of the present invention, since the weight coefficients can be provided without manpower being required, the need for human labor can be reduced.

According to the fifth and thirteenth aspects of the present invention, the degree to which the efficiency of the usage of the apparatus to be managed is affected can be added to the alarm statistics.

According to the sixth and fourteenth aspects of the present invention, since the alarms generated by the apparatus to be managed are linked with the apparatus data by using the alarm generation date and time as a key, the relationship between the generation of an alarm and predetermined apparatus data can be obtained. That is, the value of the predetermined apparatus data when the alarm was generated can be easily identified by using the trend graph. As a result, the reason an alarm was generated can be easily determined.

According to the seventh and fifteenth aspects of the present invention, since the alarm generation situation in a specific operating state of the apparatus to be managed can be obtained by referring to the thus prepared alarm statistics, the reason an alarm was generated can be easily determined. Further, the statistics prepared in this manner are also effective for the application of a countermeasure that is, first of all, for an alarm generated under a specific condition.

According to the eighth and sixteenth aspects of the present invention, the amount of data to be handled can be reduced, and the display of an alarm can be simplified.

What I claim is:

1. An alarm management method comprising:
   generating one or more alarms at one or more apparatuses to be managed;
   transmitting alarm data associated with each alarm from each apparatus to an alarm management apparatus, wherein the alarm data includes a date and time at which the alarm was generated;
   providing one or more types of weight coefficients for each alarm;
   multiplying the weight coefficient types to obtain the total weight coefficient for each alarm;
   multiplying, by the total weight coefficient, a case count for one generation of each alarm, and obtaining a weighted case count for each alarm; and
   adding the weighted case counts for individual alarms to prepare statistics for the weighted number of alarm generation cases.

2. An alarm management method according to claim 1, wherein the one or more weight coefficient types include a weight coefficient designated by a user as an inherent value for each alarm type.

3. An alarm management method according to claim 1, wherein the one or more weight coefficient types include a weight coefficient designated by a user for each time an alarm is generated.

4. An alarm management method, according to claim 1, wherein the one or more weight coefficient types include a weight coefficient that is automatically determined based on a predetermined rule.

5. An alarm management method according to claim 4, wherein the automatically determined weight coefficient is determined in accordance with a period extending from the generation, in the apparatus, of a specific alarm to be managed until the specific alarm is canceled.

6. An alarm management method according to claim 1, wherein the alarms are managed using alarm IDs or using alarm IDs and apparatus IDs for identifying the alarms.

7. An alarm management method comprising:
   generating one or more alarms at one or more apparatuses to be managed;
   transmitting alarm data associated with each alarm from each apparatus to an alarm management apparatus, wherein the alarm data includes a date and time at which the alarm was generated;
   transmitting apparatus data associated with each apparatus to the alarm management apparatus, wherein the apparatus data represents the status of the apparatus and correlates with each alarm generated by each apparatus using the date and time wherein the alarm was generated as a key;
   preparing a trend graph for predetermined apparatus data included in the apparatus data obtained from the apparatus to be managed; and
   displaying on the trend graph the date and time whereat a predesignated alarm was generated based on the correlation.

8. An alarm management method according to claim 7, wherein the alarms are managed using alarm IDs or using alarm IDs and apparatus IDs for identifying the alarms.

9. An alarm management method comprising:
   generating one or more alarms at one or more apparatuses to be managed;
   transmitting alarm data associated with each alarm from each apparatus to an alarm management apparatus, wherein the alarm data includes a data and time at which the alarm was generated;
   transmitting apparatus data associated with each apparatus to the alarm management apparatus, wherein the apparatus data represents the status of the apparatus and correlates with each alarm generated by each apparatus using the date and time wherein the alarm was generated as a key;
   preparing statistics for alarms only when correlated apparatus data have a predesignated value or are within a predesignated range.

10. An alarm management method according to claim 9, wherein the alarms are managed using alarm IDs or using alarm IDs and apparatus IDs for identifying the alarms.

11. An alarm management apparatus comprising:
   a data collection device for collecting alarm data for alarms from an apparatus where the alarms are generated, wherein the alarm data includes a date and time at which the alarm was generated;
   a database device for storing the alarm data collected by the data collection device; and
   an alarm statistic device for preparing alarm statistics using the alarm data stored by the database device, the alarm statistic device including, a weight coefficient provision unit for providing one or more types of weight coefficients for each alarm, a total weight coefficient calculation unit for multiplying the weight coefficients for each alarm to obtain a total weight coefficient, a weighted case count calculation unit for multiplying, by the total weight coefficient, a case count for one generation of each alarm, and for obtaining a weighted case count for each alarm, and a statistics preparation unit for adding weighted case counts for individual alarms to obtain statistics for the weighted number of alarm generation cases.

12. An alarm management apparatus according to claim 11, wherein the alarm statistic device includes, a weight coefficient setup unit for setting up, as one of the weight coefficients, a unique weight coefficient for each alarm type.

13. An alarm management apparatus according to claim 11, wherein the alarm statistic device includes:

a weight coefficient setup unit for setting up, as one of the weight coefficients, a weight coefficient for each time an alarm is generated.

14. An alarm management apparatus according to claim 11, wherein the alarm statistic device includes:

a weight coefficient determination unit for automatically determining, based on a predetermined rule, a weight coefficient as one of the weight coefficients.

15. An alarm management apparatus according to claim 14, wherein the weight coefficient determination unit determines a weight coefficient in accordance with a period extending from the generation, in the apparatus, of a specific alarm to be managed to the cancellation of the specific alarm.

16. An alarm management apparatus according to claim 11, wherein the alarms are managed by alarm IDs for identifying the alarms.

17. An alarm management apparatus comprising:

a data collection device for collecting alarm data for alarms from an apparatus where the alarms are generated, wherein the alarm data includes a date and time at which the alarm was generated;

a database device for storing the alarm data collected by the data collection device; and an alarm statistic device for preparing alarm statistics using the alarm data stored by the database device, the alarm statistic device including, a linking unit for employing, as a key, a date and a time whereat an alarm was generated and for correlating each alarm generated by the apparatus with apparatus data representing the status of the apparatus, a trend graph preparation unit for preparing a trend graph for predetermined apparatus data included in the apparatus data, and a display unit for displaying the trend graph prepared by the trend graph preparation unit, and for, based on the correlation, displaying on the trend graph a date and time whereat a predesignated alarm was generated.

18. An alarm management apparatus according to claim 17, wherein the alarms are managed by alarm IDs for identifying the alarms.

19. An alarm management apparatus comprising:

a data collection device for collecting alarm data for alarms from an apparatus where the alarms are generated, wherein the alarm data includes a date and time at which the alarm was generated;

a database device for storing the alarm data collected by the data collection device; and an alarm statistic device for preparing alarm statistics using the alarm data stored by the database device, the alarm statistic device including, a filtering unit for extracting, as statistical targets, only alarms that were generated by the apparatus when predetermined apparatus data, included in apparatus data, had a predesignated value or was within a predesignated range, and a statistics preparation unit for preparing statistics for the alarms extracted by the filtering unit.

20. An alarm management apparatus according to claim 19, wherein the alarms are managed by alarm IDs for identifying the alarms.

* * * * *

UNITED STATES PATENT AND TRADEMARK OFFICE
CERTIFICATE OF CORRECTION

PATENT NO. : 7,085,674 B2
APPLICATION NO. : 10/721084
DATED : August 1, 2006
INVENTOR(S) : Koji Iwasawa Page 1 of 1

It is certified that error appears in the above-identified patent and that said Letters Patent is hereby corrected as shown below:

Col. 14, line 44, "a data" should read --a date--.

Signed and Sealed this

Thirteenth Day of February, 2007

JON W. DUDAS
*Director of the United States Patent and Trademark Office*